March 31, 1936.  A. O. WALKER  2,035,851
FILTER
Filed Aug. 13, 1934  2 Sheets-Sheet 1
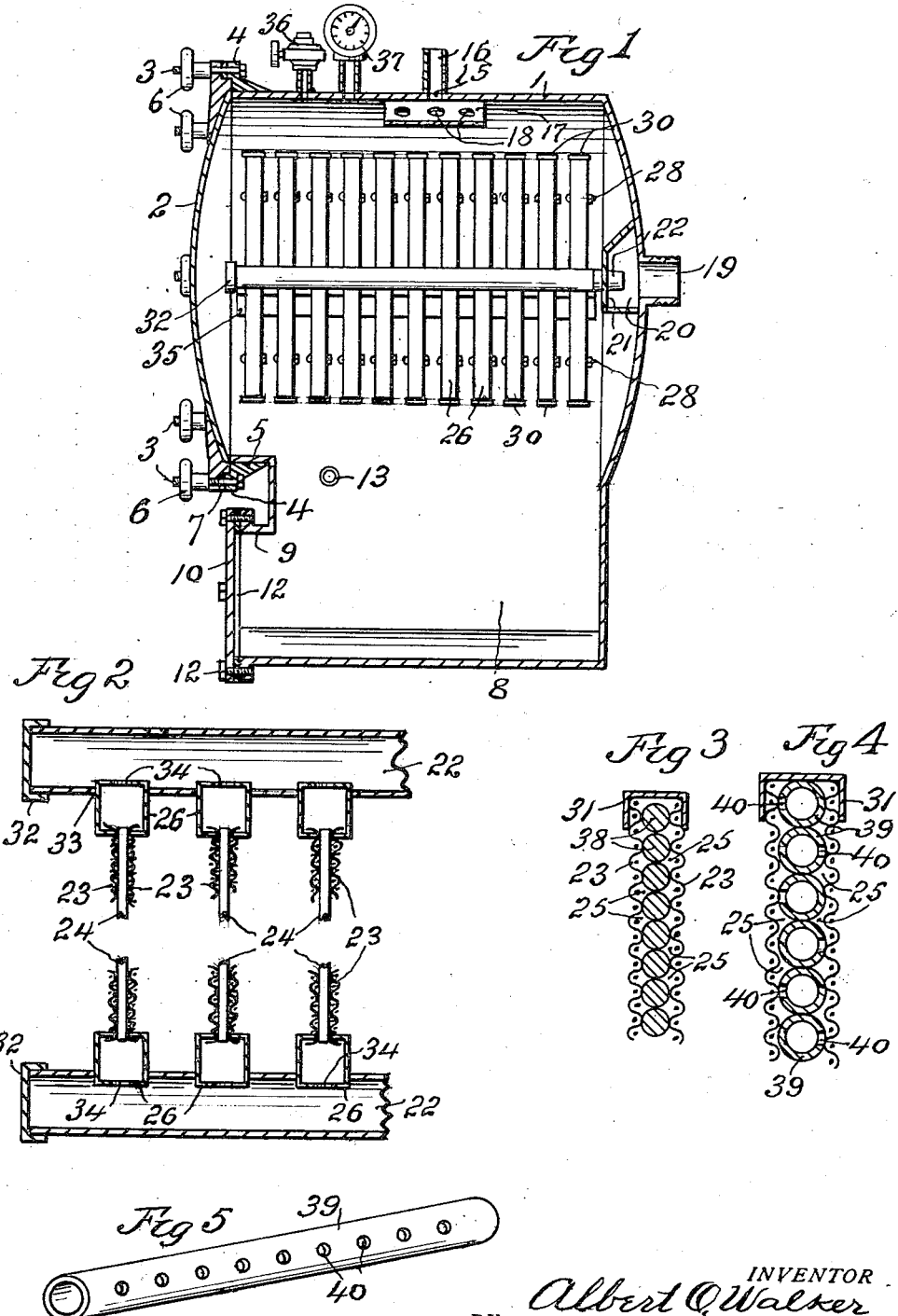
INVENTOR
Albert O. Walker
BY Warren D. House
His ATTORNEY

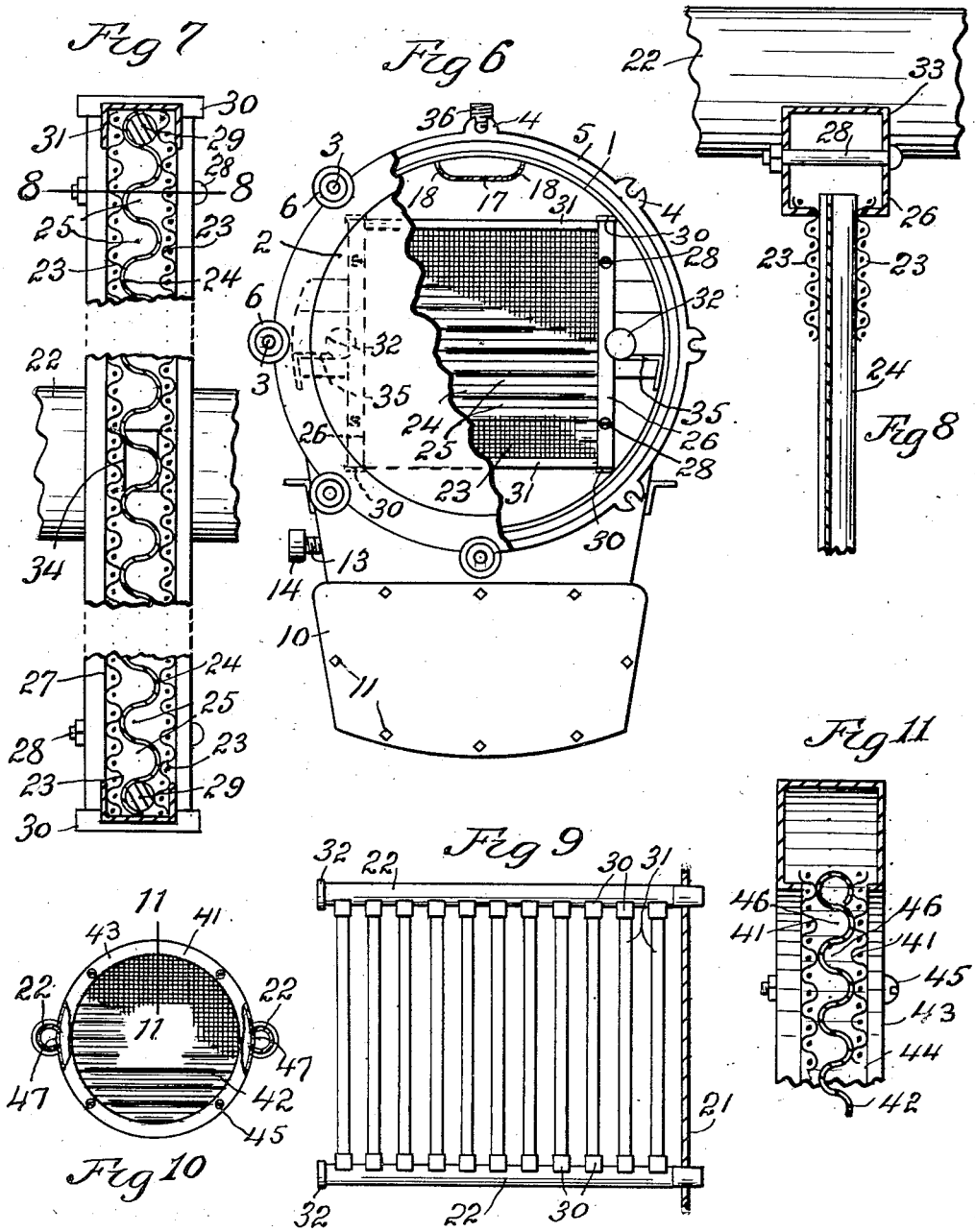
March 31, 1936. A. O. WALKER 2,035,851
FILTER
Filed Aug. 13, 1934 2 Sheets-Sheet 2
INVENTOR
Albert O. Walker
BY Warren L. House
His ATTORNEY Patented Mar. 31, 1936

2,035,851

UNITED STATES PATENT OFFICE 2,035,851

FILTER

Albert O. Walker, Jackson County, Mo., assignor of one-third to William B. Hargraves, Kansas City, Mo.

Application August 13, 1934, Serial No. 739,560

2 Claims. (Cl. 210—182)

My invention relates to improvements in filters. It relates particularly to a filter adapted to remove foreign matter from cleaning liquids, such as are used by cleaning establishments for cleaning garments, fabrics and the like. It also relates to filters of the pressure type employing screens upon which is adapted to collect a filtering aid powder which is intermingled with the liquid to be cleaned.

One of the objects of my invention is the provision of novel filtering means of maximum efficiency, which is simple, relatively cheap to manufacture, which is durable, not likely to get out of order, and which is readily removable for needed repairs and as readily reinserted.

A further object of my invention is the provision of a novel filtering element which includes a plurality of filtering units united together to form a unitary body adapted for insertion into and removal from a filtering chamber as a unit.

Still another object of my invention is the provision of a novel filtering unit embodying two screens with novel means for holding the screens from collapsing under pressure, and which holding means provides a maximum of efficiency in the clearing of the screens of foreign matter and from being clogged in any portion by the filtering aid powder, when a back flow under pressure is established through the screens.

My invention provides still further novel partitioning means between the screens of a unit which prevents filtered liquid passing through the partitioning means, and which provides at opposite sides of the partitioning means channels which effect easy and unrestricted discharge of the filtered liquid from between the screens of the unit.

The novel features of my invention are hereinafter fully described and claimed.

In the accompanying drawings, which illustrate my invention,

Fig. 1 is a view showing the filter casing in central vertical longitudinal section, and showing the filtering element in side elevation.

Fig. 2 is a central horizontal sectional view, enlarged, of a portion of the filtering element, parts being broken away, and which employs the corrugated plates as partitioning means between the screens.

Fig. 3 is an enlarged vertical section of a portion of a filtering unit which employs rods disposed longitudinally edge to edge as the partitioning means between the screens of the unit.

Fig. 4 is an enlarged vertical sectional view of a portion of another modification of the filtering unit in which tubular members disposed longitudinally edge to edge form the partitioning means between the screens of the unit.

Fig. 5 is an enlarged perspective view of one of the tubular partition members shown in Fig. 4.

Fig. 6 is a front elevation, partly broken away and parts removed, of my improved filter.

Fig. 7 is an enlarged vertical section, partly broken away, of one of the filtering units shown in Figs. 2, 6, and 8, and part of one of the discharge tubes connected therewith.

Fig. 8 is a section on the line 8—8 of Fig. 7.

Fig. 9 is a plan view of the filtering unit, enlarged, shown in Figs. 1 and 6.

Fig. 10 is a reduced end view, partly broken away, of a modification of the filtering element.

Fig. 11 is an enlarged section on the line 11—11 of Fig. 10.

Similar characters of reference designate similar parts in the different views.

1 designates the horizontal cylindrical portion of a tank or casing, one end of the tank being closed, and the other end of the cylindrical portion 1 is open and adapted to be closed by a head 2 removably fastened by bolts 3 respectively disposed in notched lugs 4 on a ring 5 which encircles and is fastened to the portion 1. Hand wheel nuts 6 on the bolts 3 removably bear against the front side of the head 2. Packing 7 is disposed between the head 2 and the ring 5.

The tank or casing below the cylindrical portion 1 forms a sump 8 into which passes by gravity the heavy foreign matter contained in the liquid which is being filtered. The casing or tank at the front of the sump 8 has a manhole 9 which is normally closed by a cover plate 10 removably fastened by bolts 11 to the front side of the tank or casing. Packing 12 is disposed between the cover plate 10 and the casing.

A drain pipe 13 normally closed by a screw cap 14 is mounted in the casing wall between the sump 8 and cylindrical portion 1. Through the drain pipe 13 liquid may be drawn off from above the heavy material which collects in the sump 8.

The upper side of the portion 1 is provided with an inlet 15 into which discharges a pipe 16 through which is conveyed into the filter the liquid to be filtered.

Fastened at its longitudinal edges to the under side of the top of the portion 1 and below the inlet 15 is a trough like plate 17 which extends lengthwise of the casing and serves as a baffle to prevent the incoming liquid to be filtered passing directly downwardly, and effects its distribution toward the ends of the casing. Lateral holes 18 are provided through the plate 17 adjacent respectively to its longitudinal edges, for assisting in the distribution of the liquid to be filtered.

The closed end of the casing or tank is provided with an outlet pipe 19 disposed in the center of the cylindrical portion 1. The outlet pipe 19 communicates with a chamber 20, the rear end of which is the rear end of the casing, and the front wall 21 of which is provided therethrough with two tapered holes in which are removably tightly fitted the tapered rear ends respectively of two parallel longitudinal tubes 22, Figs. 1, 6, and 9, which form the discharge tubes of a filtering element consisting of the two tubes 22 and a plurality of filtering units, each of which, in the preferred form of my invention, shown in Figs. 2, 6, 7, and 8, consists of two rectangular screens 23 spaced apart and disposed parallel with each other in a vertical position transversely to the axis of the portion 1 of the casing.

Each screen 23 is, preferably composed of screen wire of fine mesh, which is adapted to have collected upon its outer side in the operation of filtering a layer of the filter aid powder, which is in the liquid to be filtered, and which effects the greater part of the filtering process.

The interior of the tank or casing, when the filter is in operation, is subjected to heavy pressure, so as to force the liquid to be filtered through the filter air powder layers and the screens 23. To prevent the screens from being forced together by such internal pressure, I provide partitioning means between and against the screens 23 of each unit.

In the form shown in Figs. 2, 6, 7, and 8, the partitioning means in each filtering unit is a corrugated plate 24, the corrugations of which extend horizontally transversely. There is thus provided at opposite sides of the partition plate 24 and between its corrugations channels 25. The partition plate 24 is imperforate transversely, so that the filtered liquid can not pass therethrough.

At opposite vertical edge portions of the screens 23 are provided respectively two vertical tubes 26, preferably square in cross section, as shown, each tube 26 having in its inner side a vertical slot 27 into which extend the adjacent vertical edge portions of the screens 23 and the partition plate 24, Figs. 2, 7, and 8.

Extending transversely through each tube 26 are bolts 28 by which the tube may be compressed to narrow the slot 27, thereby tightly clamping the screens 23 to the partition plate 24.

As shown in Fig. 7, there are located respectively in the upper and lower channels 25 horizontal rods 29, which brace the partition plate 24 and prevent its distortion by the clamping action of the tubes 26.

The other channels 25 have their opposite ends discharging respectively into the tubes 26.

The upper and lower ends of each tube 26 are respectively provided with caps 30, preferably removable but tightly fitted thereon.

Two channel members 31 respectively embrace the upper and lower edge portions of the screens 23 of each unit, such members 31 extending from one tube 26 to the opposite tube 26 of the unit.

The front ends of the tubes 22 are respectively closed by caps 32, the rear ends of the tubes being open. The tubes 22 are preferably disposed in the same horizontal plane at about the middle of the length of the tubes 26. The latter are firmly fastened, as by welding, in notches 33 provided in the adjacent side of the adjacent tube 22. Each tube 26 is provided with an outlet opening 34, Figs. 2 and 7, which communicates with the interior of the adjacent tube 22. The tubes 26 serve, thus as conducting means for conveying the filtered liquid from between the screens 23 into the tubes 22.

The tubes 22 in addition to their function of discharging the filtered liquid into the chamber 20, also serve to support the filtering units, and they in turn are slidably mounted upon two angle bars 35 respectively, which bars are disposed longitudinally respectively against and are secured to the inner side walls of the portion 1 of the casing. The dimensions of the filtering element are such that, when the hand wheel nuts 6 are loosened and the bolts 3 removed, and the head 2 also removed, the filtering element comprising the tubes 22 and the filtering units may be withdrawn through the open end of the portion 1.

On the casing 1 is a valve closed air vent 36 and a pressure gage 37.

In the operation of the filter, the liquid to be filtered is fed into the tank through the inlet pipe 16, the parts being disposed as shown in Figs. 1 and 6. In the tank mixed with the liquid therein is placed the filter aid powder. The liquid will be subjected to pressure in the tank and will pass through the screens 23 of each filtering unit, and will pass thence in a filtered condition through the channels 25 into the tubes 26 and thence through the tubes 22 into the chamber 20 from which it will pass out of the tank through the outlet pipe 19.

The heavy material will enter the sump 8 and the lighter materials contained in the liquid to be filtered, will collect on or be held back by the screens 23. The filter aid powder will be deposited on the outer sides of the screens in layers which will thicken as the filtering operation continues. When the layers of filter aid powder have become too thick, so as to interfere with the proper filtering, the stream of filtered liquid is reversed, and is forced through the outlet pipe 19 into the chamber 20, and thence through the tubes 22 and 26 into the channels 25 at opposite sides of the partition plates 24.

With the provision of the imperforate or transversely closed partition plates 24, the liquid entering between the screens 23 of each unit through the channels 25 can only pass out at the side of the partition plate 24 at which it enters, thus the pressure against the inner sides of the screens 23 will be equally distributed over each screen, which will result in a maximum cleaning effect which will remove the lint and other foreign material and substantially all of the filter aid powder from the outer side of each screen.

After such removal of the foreign material and layers of filter aid from the outer sides of the screens 23, the liquid may be withdrawn through the drain pipe 13, following which the cover plate 10 may be removed, and the material which has been deposited in the sump 8 may then be removed.

After the screw cap 14 has been reapplied to the drain pipe 13, and the cover plate 10 replaced in its operative position, the supply of liquid to be filtered may be renewed, the air vent 36 being opened to permit of the escape of air from the tank. When the tank is filled with liquid, the air vent is closed, and the operation of filtering continued.

In the modified form of partition shown in Fig. 3, the filtering member comprises horizontal rods 38 disposed lengthwise edge to edge between the screens 23 of each filtering unit. The rods being cylindrical, as shown, form channels 25 on each side of the partition. If desired the rods may be welded or fastened together otherwise, so as to form a transversely imperforate partition.

In the form of partition shown in Figs. 4 and 5, the partition is formed of tubular cylindrical members 39 disposed longitudinally horizontally edge to edge between and against the screens 23. The tubular members 39 are fastened together so as to form a transversely imperforate partition, and channels 25 are provided at opposite sides of this partition which discharge into tubes 26, as do the channels 25 in the form shown in Fig. 7.

In both forms shown in Figs. 3 and 4, the partition members are clamped by the screens 23. In the form shown in Fig. 4, alternate tubular members 39 may be provided at one side with holes 40 which communicate interiorly therewith. The other members of the partition are provided at the opposite side each with holes 40. The provision of the tubular members 39 having the holes 40 affords means additional to the channels 25 for conveying the filtered liquid into the tubes 26 into which the tubular members 39 extend.

In other respects than just described, the filtering units of which the members 38 and 39 respectively form parts, correspond in structure to the form shown in Figs. 6, 7, and 8 having the corrugated plate 24 as a partition.

In the modification shown in Figs. 10 and 11, the screens 41, corresponding to the screens 23, and the corrugated partition plate 42, corresponding to the plate 24, are circular, and in lieu of the two tubes 26 there is provided a circular channel member 43, having an inner peripheral annular slot 44 into which extend the screens 41 and partition plate 42, the circular channel member 43 having therethrough transverse bolts 45 by which the channel member is compressed so as to bind the screens 41 against the partition plate 42. The channels 46, corresponding to the channels 25, at each side of the plate 42 discharge into the circular channel member 43 opposite sides of which are provided with discharge openings 47 communicating with the tubes 22, which are respectively attached to diametrically opposite sides of the member 43, in the same manner as they are attached to the tubes 26.

In the operation of the form shown in Figs. 10 and 11, the liquid to be filtered passes through the screens 41 into the channels 46, and thence into the channel member 43, from which it passes through the openings 47 into the tubes 22, which convey it to the chamber 20, as has been described.

The advantage obtained with the use of the imperforate partition plate 42 is the same as has been described with relation to the partition plate 24.

Many modifications of my invention, other than shown and described and within the scope of the appended claims, may be made without departing from the spirit of my invention.

What I claim is:—

1. In a filter, a casing adapted to contain liquid to be filtered and having an inlet, and provided at one end with a removable head and at the other end with a chamber having an outlet and having in its front side two holes, a plurality of filtering units in said casing adapted to be immersed in the liquid therein, each unit comprising two parallel screens, transversely closed partitioning means between and against said screens and forming channels between said screen and said partitioning means, and channel liquid conducting means embracing opposite edge portions of said screens and into which said channels discharge, two tubes respectively communicating with said conducting means of said units at opposite sides respectively of said units and respectively removably fitted in said holes, and means in said casing supporting said tubes.

2. In a filter, a casing adapted to contain liquid to be filtered and having an inlet and at one end a removable head and at the other end a chamber having an outlet, said chamber having in its front side two holes, a plurality of filtering units in said casing adapted to be immersed in the liquid therein, each unit having at opposite side edges thereof liquid conducting means and having filtering means discharging into said conducting means, two tubes respectively communicating with said conducting means of said units at opposite sides of said units and respectively removably fitted in said holes and supporting and adapted to be withdrawn with said units from said casing when said head is removed, and means in said casing releasably supporting said tubes.

ALBERT O. WALKER.